United States Patent [19]

Tahara

[11] 4,034,413
[45] July 5, 1977

[54] MAGNETIC HEAD LIFTING DEVICE

[75] Inventor: Kumeo Tahara, Iwaki, Japan

[73] Assignee: Motorola, Inc., Schaumburg, Ill.

[22] Filed: Aug. 29, 1975

[21] Appl. No.: 608,854

[30] Foreign Application Priority Data

Sept. 5, 1974  Japan ............... 49-106992[U]

[52] U.S. Cl. .................. 360/106; 360/78; 360/130

[51] Int. Cl.² ............ G11B 21/08; G11B 5/55

[58] Field of Search ........... 360/106, 78, 92, 130, 360/93, 109

[56] References Cited

UNITED STATES PATENTS

| | | | |
|---|---|---|---|
| 3,429,578 | 2/1969 | Furuichi | 360/106 |
| 3,502,340 | 3/1970 | Klein et al. | 360/106 |
| 3,531,126 | 9/1970 | Tsukagoshi et al. | 360/106 |
| 3,575,422 | 4/1971 | Peltz | 360/78 |
| 3,820,160 | 6/1974 | Huber | 360/106 |
| 3,869,725 | 3/1975 | Dattilo | 360/106 |
| 3,877,071 | 4/1975 | Matsuzaki | 360/106 |
| B 487,411 | 2/1976 | Nishinakagawa | 360/78 |

Primary Examiner—Alfred H. Eddleman
Attorney, Agent, or Firm—Phillip H. Melamed; James W. Gillman; Donald J. Lisa

[57] ABSTRACT

A magnetic head lifting device for a tape recorder is disclosed in which the turning force of a capstan shaft is used as a drive source for the head lifting device. The device includes a rotary body having indented portions in a peripheral edge, a ring attached to a capstan shaft and engageable with the nonindented portions of the peripheral edge of the rotary body, a rotary body urging member, a rotary body stopping member, an electromagnet, an antiexcessive rotation member positioned by the electromagnet to positively prevent excessive rotation of the rotary body, and a stepped surface cam associated with said rotary body for lifting the magnetic head in response to the rotation of the rotary body. The head lifting device provides a positive engagement and disengagement between the capstan shaft and the rotary body and prevents any malfunction due to an excessive rotation of the rotary body by the capstan shaft. The device is miniaturized since only a small capacity electromagnet is required.

10 Claims, 5 Drawing Figures

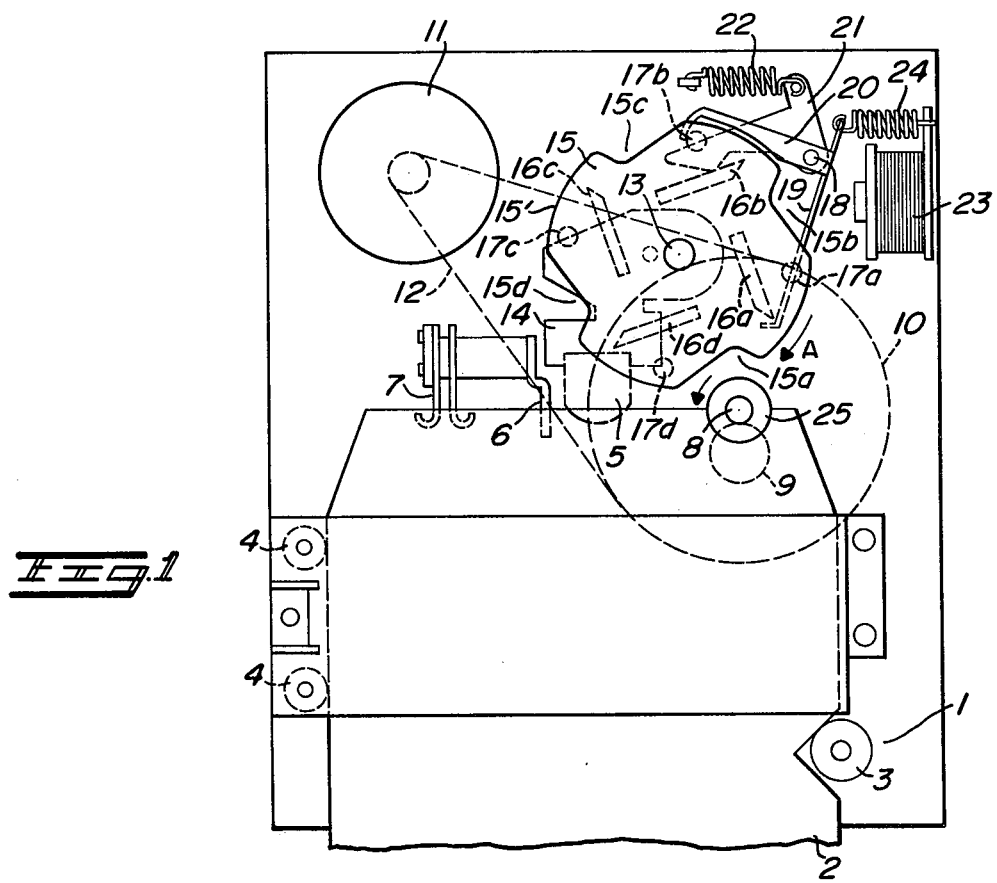
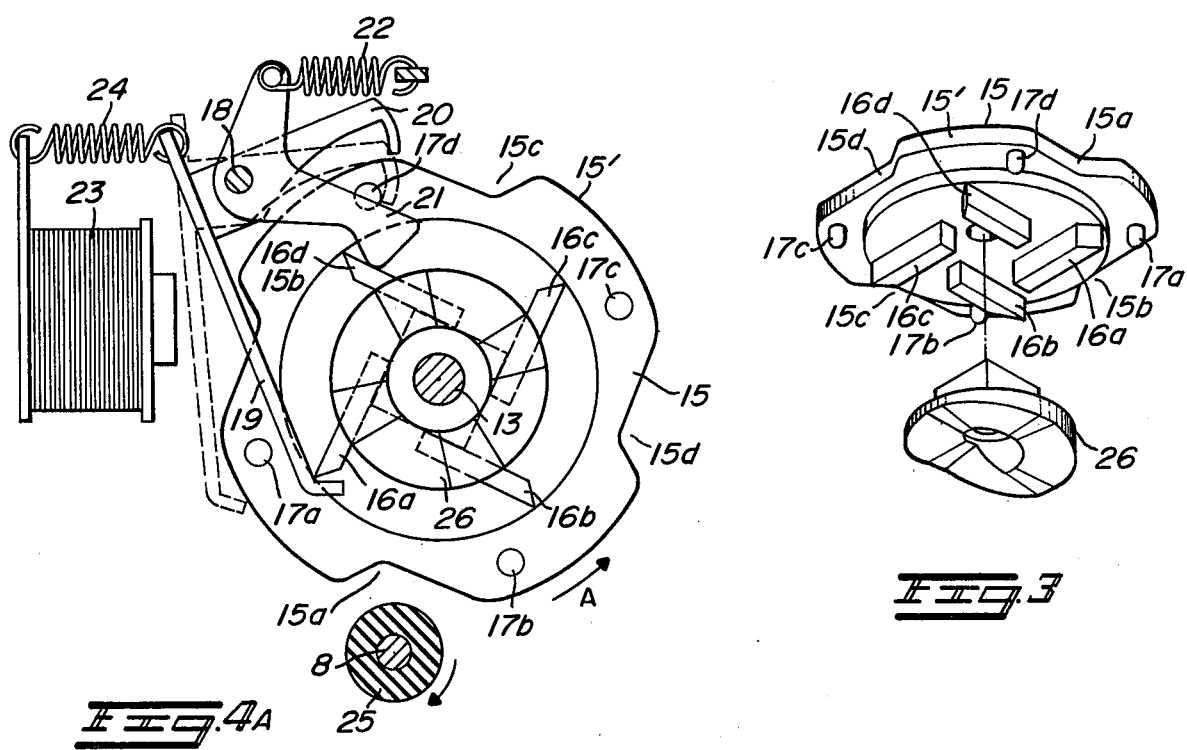

MAGNETIC HEAD LIFTING DEVICE

BACKGROUND OF THE INVENTION

1. Field of the Invention

The invention is related to the field of magnetic head lifting devices in a tape recorder in which the drive source for the lifting device is the turning force of a capstan shaft.

2. Description of the Prior Art

In prior art tape head lifting devices a magnetic head is maintained in resilient contact with a stepped cam surface of a disklike cam and the cam is rotated by an electromagnet. This rotation of the cam causes a change in the portion of the stepped cam surface which is in contact with the head and thereby causes the magnetic head to move up and down. In this prior device, however, a bulky electromagnet is required to rotate the cam and this results in the device becoming very large. In addition, a large amount of electric power is consumed which results in a serious disadvantage for portable tape player/recorders which are battery powered.

To overcome the above-mentioned deficiencies, a tape recorder was developed in which the drive source for moving the magnetic head is the turning force of a capstan shaft. One such recorder is disclosed in U.S. Pat. No. 3,877,071 assigned to the same assignee as the present invention. In this type of recorder, a ring is fastened to a capstan shaft and serves as a means to utilize the turning force of the capstan shaft to lift the magnetic head. The ring is normally opposite an indented portion formed in a peripheral edge of a rotary body. The rotary body is initially rotated by the driving force of an electromagnet so that the ring will subsequently engage the nonindented peripheral edge of the body. The rotary body is then rotated by the ring until the ring is again opposite an indented portion of the rotary body, which therefore results in disengaging the rotary body from the ring. This prior head lifter device tends to malfunction in that the rotary body is often excessively rotated because of its inertia, and this results in the rotation of the rotary body beyond its desired stop position which in turn results in a reengagement between the ring and the nonindented portions of the peripheral edge of the rotary body. Therefore when such a head lifting device is used to switch between different tape tracks in a multi-track tape player, the excessive rotation can result in a nondesired skipping of one or more tape tracks.

SUMMARY OF THE INVENTION

It is therefore an object of this invention to provide a magnetic head lifting device which overcomes the aforementioned disadvantages and assures a positive engagement and disengagement between the turning force of a capstan shaft and a rotary body.

In one embodiment of the present invention there is provided a magnetic head lifting device adaptable for use in a multi-track tape player. The lifting device comprises: a rotary body having a peripheral edge with indented portions therein; ring means rotatable in association with a capstan shaft and positioned for rotating said rotary body by engaging the peripheral edge of said rotary body and disengaging said edge at said indented portions thereof; urge member means for urging said rotary body in a predetermined direction of rotation; stopper means for engaging said rotary body and preventing the rotation of said rotary body by said urge member means; actuating means for disengaging said stopper means from said rotary body and permitting the rotation of said rotary body by said urge means, the rotation of said rotary body thereby causing said ring means to engage the peripheral edge of said rotary body; anti-excessive rotation means including a member having its position controlled by said actuation means for selectively engaging said rotary body and positively preventing an excessive rotation of said rotary body by said ring means, and stepped surface cam means associated with the rotation of said rotary body for moving the position of the magnetic head.

BRIEF DESCRIPTION OF THE DRAWINGS

For a more complete understanding of the present invention reference should be made to the drawings, in which:

FIG. 1 is a top plane view of a cartridge tape player having a magnetic head lifting device;

FIGS. 2 and 3 are perspective views illustrating portions of the tape player in FIG. 1; and FIGS. 4A and 4B are bottom plane views of the tape player in FIG. 1.

DESCRIPTION OF THE PREFERRED EMBODIMENT

Figure 2:
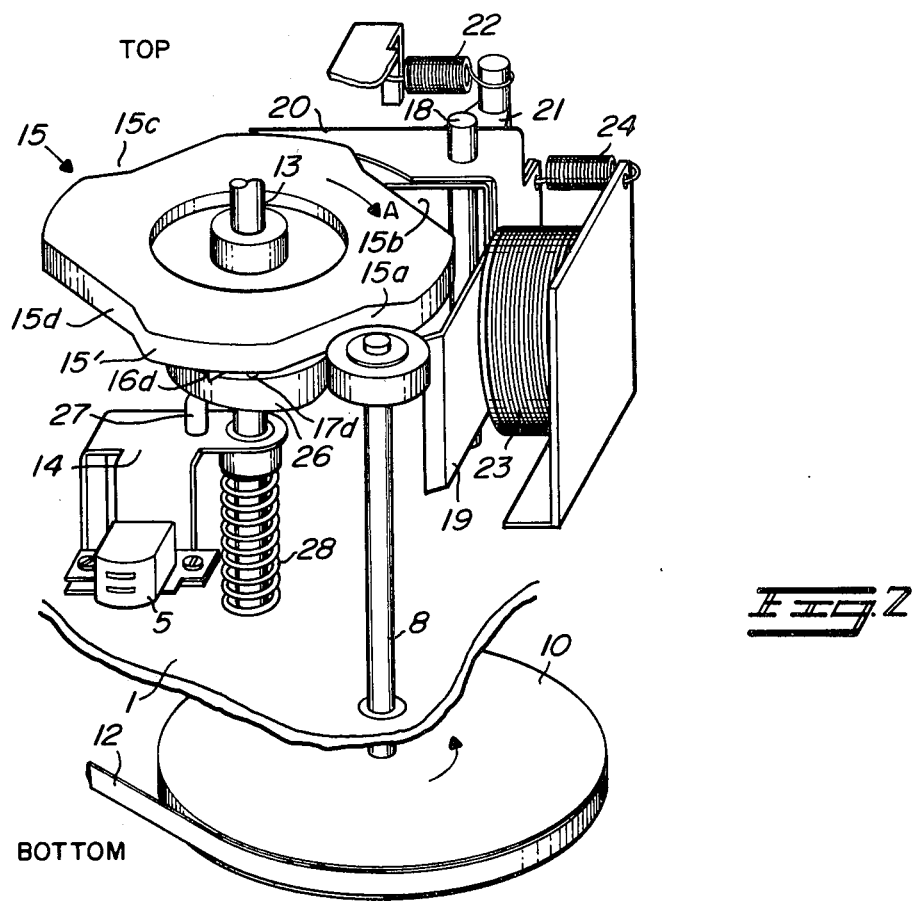

Referring to FIGS. 1 and 2, there is shown a tape player chassis 1 and a tape cartridge 2 inserted in the chassis and held by a roller 3 and guide rollers 4. All of the figures use identical reference numbers for corresponding parts which are common to the figures. Positioned at one end of the cartridge 2 are a magnetic head 5, a tape guide 6, and a contact switch 7. A capstan shaft 8, rotatably disposed in the chassis 1, is brought into contact with a pinch roller 9, rotatably disposed in the tape cartridge 2, to provide a drive force for moving the magnetic tape (not shown) of the cartridge 2 past the magnetic head 5. A flywheel 10 is disposed below the chassis 1 and the capstan shaft 8 is rigidly attached to the center of the flywheel 10. The rotation of a motor 11 is transmitted to the flywheel 10 by a belt 12.

Extending through the chassis 1 is a first shaft 13 on which a mounting plate 14, having the magnetic head 5 attached thereto, is slidably supported so that it may move up and down the shaft 13. This first shaft 13 has a rotary body 15 rotatably supported thereon. The body 15 is made of plastic or the like and has four indented portions 15a, 15b, 15c and 15d formed in a peripheral edge 15' thereof. Four engaging members 16a, 16b, 16c, and 16d and four pins 17a, 17b, 17c, and 17d are integrally formed, as shown, on the underside of the rotary body 15. A second shaft 18 is attached to the chassis 1 and thas a stopper 9 and an anti-excessive rotation member 20 rotatably supported thereon. The stopper 19 is adaptable for engagement with the engaging members 16a, 16b, 16c and 16d and the anti-excessive rotation member 20 is adaptable for engagement with the pins 17a, 17b, 17c and 17d. The stopper 19 and the anti-excessive rotation member 20 are integrally formed and generally form an angle which includes the rotational axis (shaft 13) of the rotary body 15.

An urge member 21 is also rotatably supported on the second shaft 18. This urge member is adapted for contacting the engaging members (16a–16d) and applying a force, supplied by a spring 22 attached to the urge member, by which the rotary body 15 is normally urged to be rotated in a clockwise direction (shown by arrow A).

The stopper 19 and the anti-excessive rotation member 20 are pivotable about the axis of the shaft 18 and a spring 24 is attached to the stopper 19 and provides a force which normally maintains the stopper in contact with one of the engaging members 16a–16d. An electromagnet 23 is positioned so as to selectively exert a magnetic force on the stopper 19 which is counter to the force exerted by the spring 23. Thus the electromagnet 23, when actuated, will magnetize the stopper 19 and thereby disengage the stopper from one of the engaging members 16a–16d.

A ring 25 is fastened to the capstan shaft 8 and rotated integrally therewith. The ring is composed of a resilient material, such as rubber, which has a substantial friction drive capability. The rotary body 15 is normally positioned such that one of the indented portions (15a–15d) of its peripheral edge 15' is opposite to the ring 25. The ring 25 is positioned such it can not engage the indented portions of the rotary body 15 but it can engage the nonindented portions.

A stepped surface cam 26 (shown in FIGS. 2 and 3) is connected to the underside of the rotary body 15 and rotated integrally therewith. The stepped surface cam 26 has a cam surface on which a raised pin 27, which is attached to the mounting plate 14 of the magnetic head 5, is elastically brought into contact with by means of a spring 28. The elastic following of the cam 26 by the pin 27 will determine the vertical position of the magnetic head 5.

The general operation of the magnetic head lifting device will now be discussed with reference to FIGS. 1–3, subsequently the operation will be discussed more fully with reference to FIGS. 4A and 4B.

When one track of the cartridge tape is completed, the magnetic head 5 must be moved to the next successive tape track. The contact switch 7 (FIG. 1) is turned on by a metal foil pasted on the end of the magnetic tape in the tape cartridge 2. The switch 7 actuates the electromagnet 23 thereby magnetizing the stopper 19, which has been engaged with one of the engaging members, such as 16a, on the rotary body 15. This engaging member (16a) has prevented the rotary body 15 from being rotated by the urge member 21. The magnetizing of the stopper 19 pivots the stopper about the axis of shaft 18 and disengages the stopper from the engaging member (16a). This results in the rotary body 15 being rotated in a clockwise direction (A) by the urge member 21. A nonindented portion of the peripheral edge 15' is thus brought into contact and engagement with the ring 25 by the rotation supplied by the urge member 21. The rotation of the ring 25, which is also the rotation of the capstan shaft 8, is thereby transmitted to the rotary body 15. Thus the rotary body 15 is rotated by a positive drive source, the capstan shaft 8, until disengagement occurs by an indented portion (15a–15d) of the peripheral edge 15' again appearing opposite to the ring 25. Consequently, the stepped surface cam 26 (see FIGS. 2 and 3) which is connected to the underside of the rotary body 15 is also rotated integrally therewith and causes a change in the height of the stepped cam surface that contacts the pin 27. Thus the magnetic head 5 is moved to a desired height suitable for the next tape track.

Figure 4B:
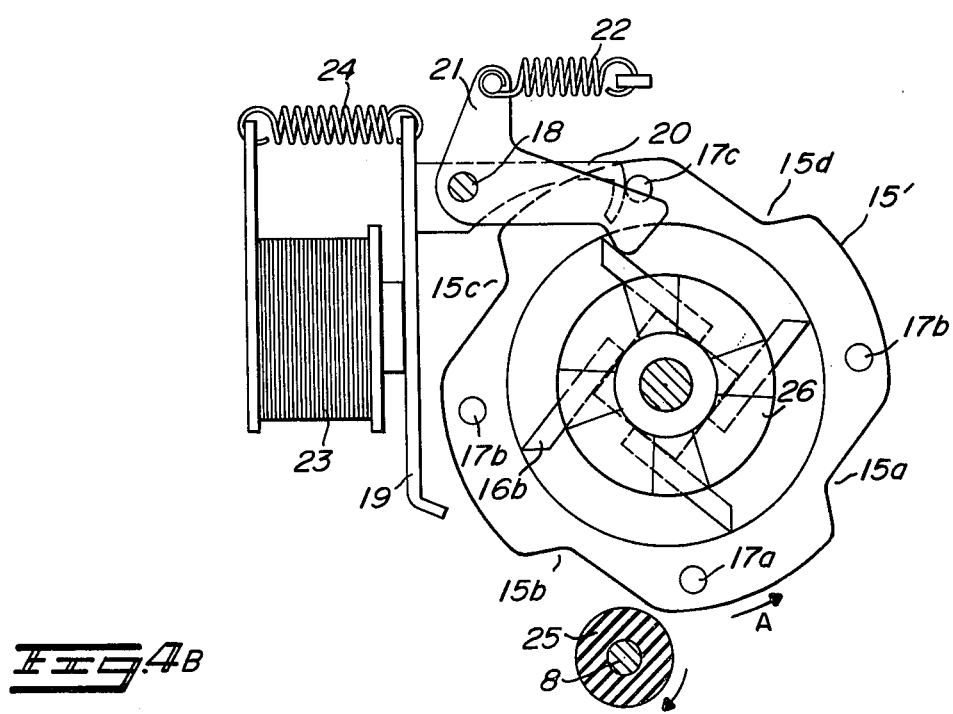

FIGS. 4A and 4B illustrate the principal parts of the magnetic head lifter mechanism as viewed from the underside of the chassis 1. These figures will explain the operation of a mechanism to prevent the excessive rotation of the rotary body 15 during the magnetic head lifting sequence which was just previously discussed.

FIG. 4A illustrates (by solid lines) the positions of the components 15, 19, and 20 just prior to the actuation of the electromagnet 23. The positions of these components just after the actuation of the electromagnet 23 are illustrated by phantom lines. When the electromagnet 23 is actuated, the tip of the stopper 19 is disengaged from the engaging member 16a. The rotary body 15 then rotates, initially because of the force contributed by the urge member 21 and subsequently because of the driving force contributed by the ring 25, until the next indented portion (15b) is positioned opposite the ring 25. The positive rotation then stops, as previously described. However, the rotary body 15 will tend to be rotated excessively due to its inertia. Therefore if the stopper 19 should remain magnetized, the ring 25 may possibly reengage the peripheral edge 15' of the rotary body 15 and repeat another cycle of operation. Such a malfunction can easily occur and is avoided in the present invention by the providing of an anti-excessive rotation member 20. This member is supported on the second shaft 18 and arranged so as to be moved toward the rotary body 15 when the stopper 19 is magnetized by the electromagnet 23.

FIG. 4B shows the positions of the components 15, 19, and 20 a predetermined time after the electromagnet 23 is actuated and before the magnet is deactivated. As shown in FIG. 4B, when the stopper 19 is magnetized, the anti-excessive rotation member 20 is moved toward the rotary body 15. The rotation of the rotary body 15 then forces a pin disposed thereon, such as the pin 17c, into contact with the member 20. This prevents the excessive rotation of the rotary body 15 by dissipating the rotary inertial force imparted to the rotary body 15 by the ring 25. When the stopper 19 is released by the electromagnet 23, the urge member 21 will attempt to rotate the rotary body 15, however the stopper 19 will engage the engaging member 16b before any significant rotation of the body 15 has occurred.

From the foregoing explanation, it will be appreciated that the present invention provides for the positive engagement and disengagement between a drive source (the capstan shaft 8) and a driven source (the rotary body 15) which will obviate a possible malfunction of a head lifting device. In addition, the stopper 19 may be magnetized by an electromagnet having an extremely small magnetizing capacity and thereby provide a magnetic head lifting device which is small in size, light in weight, and economical in cost. Thus the present invention has various beneficial aspects.

It is to be understood that the invention is not limited to the details of the parts illustrated in the above-mentioned embodiment, since the invention may be embodied in various designs without departing from the scope of the invention as claimed. For example, while the ring 25 is said to be composed of an elastic material such as rubber (in the preferred embodiment), the ring is not limited to such an elastic material but may be made of plastic or metal. Also, the rotary body 15 may not necessarily have a cylindrical shape, but may consist of a gear engageable with a gear-like body. In addition, the stepped surface cam 26 may be formed integral with the rotary body 15.

While I have shown and described specific embodiments of this invention, further modifications and improvements will occur to those skilled in the art. All such modifications which retain the basic underlying principles disclosed and claimed herein are within the scope of this invention.

I claim:

1. A magnetic head lifting device adaptable for use in a multi-track tape player, comprising:

a rotary body having a peripheral edge with indented portions therein;

ring means rotatable in association with a capstan shaft and positioned for rotating said rotary body by engaging the peripheral edge of said rotary body and disengaging said edge at said indented portions thereof, urge member means for selectively urging said rotary body in a predetermined direction of rotation;

stopper means for selectively engaging said rotary body and preventing the rotation of said rotary body by said urge member means;

actuation means for disengaging said stopper means from said rotary body and permitting the rotation of said rotary body by said urge means, the rotation of said rotary body thereby causing said ring means to engage the peripheral edge of said rotary body;

anti-excessive rotation means including a member having its position controlled by said actuation means for selectively engaging said rotary body and positively preventing an excessive rotation of said rotary body by said ring means, and stepped surface cam means integrally associated with the rotation of said rotary body for moving the position of the magnetic head.

2. A magnetic head lifting device according to claim 1 wherein said ring means is concentrically attached to the capstan shaft and is composed of an elastic material.

3. A magnetic head lifting device according to claim 1 wherein said anti-excessive rotation member is pivotable about a first axis.

4. A magnetic head lifting device according to claim 3 wherein said stopper means includes a member pivotable about said first axis.

5. A magnetic head lifting device according to claim 4 wherein said stopper member and said anti-excessive rotation member are rigidly attached to each other.

6. A magnetic head lifting device according to claim 5 wherein said anti-excessive rotation member and said stopper member are positioned to form an angle which includes the axis about which said rotary body is rotated.

7. A magnetic head lifting device according to claim 5 wherein said urge means includes a member which is pivotable about said first axis.

8. A magnetic head lifting device according to claim 5 wherein said rotary body has pins rigidly attached thereto for selectively engaging said anti-excessive rotation member.

9. A magnetic head lifting device according to claim 5 wherein said rotary body has engaging members rigidly attached thereto for selectively engaging said stopper member.

10. A magnetic head lifting device according to claim 5 wherein said actuating means includes an electromagnet.

* * * * *

UNITED STATES PATENT AND TRADEMARK OFFICE
CERTIFICATE OF CORRECTION

PATENT NO. : 4,034,413
DATED : JULY 5, 1977
INVENTOR(S) : KUMEO TAHARA

It is certified that error appears in the above-identified patent and that said Letters Patent are hereby corrected as shown below:

After the colon following the word assignee in item [73] on the cover page of the patent:

Please delete "Motorola, Inc., Schaumburg, Illinois" and insert --ALPS Motorola, Inc., a corporation of Japan having a principle place of business in Tokyo, Japan.--

Signed and Sealed this

Sixth Day of December 1977

[SEAL]

Attest:

RUTH C. MASON
Attesting Officer

LUTRELLE F. PARKER
Acting Commissioner of Patents and Trademarks